(12) United States Patent
Kirk et al.

(10) Patent No.: US 11,176,127 B2
(45) Date of Patent: Nov. 16, 2021

(54) ACCELERATING QUERIES BASED ON ZONE EXPRESSION MAPS

(71) Applicant: SAP SE, Walldorf (DE)

(72) Inventors: Steven A. Kirk, Chelmsford, MA (US); Roland F. McKenney, Billerica, MA (US)

(73) Assignee: SAP SE, Walldorf (DE)

( * ) Notice: Subject to any disclaimer, the term of this patent is extended or adjusted under 35 U.S.C. 154(b) by 906 days.

(21) Appl. No.: 15/616,885

(22) Filed: Jun. 7, 2017

(65) Prior Publication Data

US 2018/0357275 A1 Dec. 13, 2018

(51) Int. Cl.
*G06F 16/2453* (2019.01)
*G06F 16/22* (2019.01)
*G06F 16/27* (2019.01)

(52) U.S. Cl.
CPC ........ *G06F 16/2453* (2019.01); *G06F 16/221* (2019.01); *G06F 16/24542* (2019.01); *G06F 16/278* (2019.01)

(58) Field of Classification Search
CPC .................................................. G06F 16/2453
See application file for complete search history.

(56) References Cited

U.S. PATENT DOCUMENTS

| | | | |
|---|---|---|---|
| 9,569,490 B1* | 2/2017 | Kalarikal Janardhana | G06F 16/245 |
| 2014/0095520 A1* | 4/2014 | Ziauddin | G06F 16/24557 707/756 |
| 2016/0098446 A1* | 4/2016 | Dickie | G06F 16/2465 707/769 |
| 2016/0162599 A1* | 6/2016 | Dickie | G06F 16/24545 707/769 |
| 2017/0091315 A1* | 3/2017 | Finlay | G06F 16/221 |
| 2017/0308572 A1* | 10/2017 | Finlay | G06F 16/2453 |
| 2018/0357275 A1* | 12/2018 | Kirk | G06F 16/24542 |

* cited by examiner

*Primary Examiner* — Dawaune A Conyers
(74) *Attorney, Agent, or Firm* — Fountainhead Law Group P.C.

(57) ABSTRACT

Some embodiments provide a non-transitory machine-readable medium that stores a program. The program receives, from a requestor, a query for data comprising a condition on a column of a table. The table includes a plurality of records divided into a plurality of zones. The program further determines a set of zones in the plurality of zones that include records that satisfy the condition based on metadata associated with each zone in the plurality of zones comprising a data interval of an expression on data values in the column of the table. The program also determines a result set of records in the table that satisfy the condition based on records in the set of zones. The program further sends the result set of records to the requestor.

20 Claims, 10 Drawing Sheets

Zone Expression Map for Modulus (T.X, 5) — 205

| Zone ID | MIN | MAX |
|---|---|---|
| 1 | 1 | 3 |
| 2 | 0 | 4 |
| 3 | 0 | 4 |
| 4 | 0 | 4 |
| 5 | 0 | 3 |
| 6 | 4 | 4 |
| 7 | 2 | 4 |
| 8 | 0 | 4 |

Cell Values of T.X — 210

| Zone ID | Cell Values |
|---|---|
| 1 | 1,2,3,1,2,1,1,3,1,2,2,3 |
| 2 | 2,4,3,5,3,2,4,5,3,2,2,2 |
| 3 | 3,5,4,3,6,5,3,5,6,4,4 |
| 4 | 3,5,6,7,6,7,7,4,1,3,4,6 |
| 5 | 5,6,5,8,7,5,7,5,6,6,7,8 |
| 6 | 14,9,4,4,9,14,4,9,9,19 |
| 7 | 8,8,7,7,8,8,8,7,9,8,9 |
| 8 | 9,8,9,9,6,8,9,10,11,9,10 |

Table T — 200

| X | BUY_DATE | NAME | AMT_BILLED | AMT_RECEIVED |
|---|---|---|---|---|
| Zone 1 | | | | |
| Zone 2 | | | | |
| Zone 3 | | | | |
| Zone 4 | | | | |
| Zone 5 | | | | |
| Zone 6 | | | | |
| Zone 7 | | | | |
| Zone 8 | | | | |

FIG. 2

Zone Expression Map for Month (T.BUY_DATE)

| Zone ID | MIN | MAX |
|---|---|---|
| 1 | 7 | 8 |
| 2 | 8 | 9 |
| 3 | 9 | 9 |
| 4 | 9 | 10 |
| 5 | 1 | 12 |
| 6 | 1 | 2 |
| 7 | 2 | 5 |
| 8 | 5 | 6 |

305

Cell Values of T.BUY_DATE

| Zone ID | Cell Values |
|---|---|
| 1 | 2015/07/21, 2015/07/29, 2015/08/01 |
| 2 | 2015/08/05, 2015/08/11, 2015/08/23, 2015/08/25, 2015/09/02 |
| 3 | 2015/09/03, 2015/09/07, 2015/09/07, 2015/09/11, 2015/09/12, 2015/09/18 |
| 4 | 2015/09/22, 2015/09/29, 2015/10/13 |
| 5 | 2015/11/12, 2015/11/18, 2015/12/06, 2016/01/17 |
| 6 | 2016/01/28, 2016/01/29, 2016/02/02, 2016/02/11, 2016/02/17 |
| 7 | 2016/02/27, 2016/03/07, 2016/03/30, 2016/04/01, 2016/04/22, 2016/05/03 |
| 8 | 2016/05/08, 2016/05/16, 2016/06/07 |

310

Table T

| X | BUY_DATE | NAME | AMT_BILLED | AMT_RECEIVED |
|---|---|---|---|---|
|  | Zone 1 |  |  |  |
|  | Zone 2 |  |  |  |
|  | Zone 3 |  |  |  |
|  | Zone 4 |  |  |  |
|  | Zone 5 |  |  |  |
|  | Zone 6 |  |  |  |
|  | Zone 7 |  |  |  |
|  | Zone 8 |  |  |  |

Zone Expression Map for Length (T.NAME)

| Zone ID | MIN | MAX |
|---|---|---|
| 1 | 4 | 5 |
| 2 | 3 | 6 |
| 3 | 7 | 8 |
| 4 | 3 | 7 |
| 5 | 3 | 4 |
| 6 | 3 | 6 |
| 7 | 6 | 9 |
| 8 | 4 | 8 |

405

Cell Values of T.NAME

| Zone ID | Cell Values |
|---|---|
| 1 | Ella, Leah, Frank, Zach, Lily |
| 2 | Ada, George, Bill, Daisy, Layla, Sara, Ben, Josh |
| 3 | William, Zachary, Jonathan, Ludmilla, Estelle |
| 4 | Ben, Lily, Darlene, Zoe, Anna, Patrick, Fred, Jim |
| 5 | Amy, Zoey, Joe, Jim, Carl, Anna, Sue, Rod, Lea |
| 6 | Leslie, Bob, Hannah, Sarah, Susan, Joe, Gabby |
| 7 | Allison, Lauren, Katherine, Steven, Roland, Thomas |
| 8 | Kimberly, Morgan, Jose, Henry, Wyatt, Connor, Dominic |

410

Table T

| X | BUY_DATE | NAME | AMT_BILLED | AMT_RECEIVED |
|---|---|---|---|---|
| | | Zone 1 | | |
| | | Zone 2 | | |
| | | Zone 3 | | |
| | | Zone 4 | | |
| | | Zone 5 | | |
| | | Zone 6 | | |
| | | Zone 7 | | |
| | | Zone 8 | | |

Zone Expression Map for
(T.AMT_BILLED – T.AMT_RECEIVED)

| Zone ID | MIN | MAX |
|---|---|---|
| 1 | 0 | 0 |
| 2 | 0 | 0 |
| 3 | 0 | 0 |
| 4 | 0 | 0 |
| 5 | -3 | 5 |
| 6 | 13 | 23 |
| 7 | 0 | 41 |
| 8 | -41 | 36 |

505

Cell Value Pairs of
{T.AMT_BILLED, T.AMT_RECEIVED}

| Zone ID | Cell Values |
|---|---|
| 1 | {103, 103}, {27, 27}, {41, 41}, {36, 36}, {17, 17}, {61, 61} |
| 2 | {41, 41}, {20, 20}, {17, 17}, {15, 15}, {20, 20}, {27, 27}, {41, 41} |
| 3 | {36, 36}, {20, 20}, {15, 15}, {201, 201}, {80, 80} |
| 4 | {61, 61}, {103, 103}, {17, 17}, {15, 15}, {20, 20}, {41, 41}, {15, 15} |
| 5 | {13, 13}, {10, 12}, {33, 28}, {78, 81}, {12, 9}, {25, 20} |
| 6 | {20, 7}, {35, 25}, {67, 44}, {58, 39}, {99, 77}, {43, 38} |
| 7 | {27, 27}, {41, 0}, {36, 36}, {17, 17}, {36, 0}, {61, 61} |
| 8 | {36, 36}, {20, 20}, {20, 61}, {36, 0}, {15, 15}, {41, 41}, {20, 20} |

510

Table T

| X | BUY_DATE | NAME | AMT_BILLED | AMT_RECEIVED |
|---|---|---|---|---|
| | | | Zone 1 | Zone 1 |
| | | | Zone 2 | Zone 2 |
| | | | Zone 3 | Zone 3 |
| | | | Zone 4 | Zone 4 |
| | | | Zone 5 | Zone 5 |
| | | | Zone 6 | Zone 6 |
| | | | Zone 7 | Zone 7 |
| | | | Zone 8 | Zone 8 |

ACCELERATING QUERIES BASED ON ZONE EXPRESSION MAPS

BACKGROUND

Database systems are typically used to manage and store data. In many cases, queries may be made against the data managed and stored by such systems. Often times, a query for data specifies one or more tables and a set of conditions. When a database system receives such a query, the database system identifies records in the one or more tables that satisfy the set of conditions. The database system then returns the identified records (e.g., a result set of the query) to the requestor of the query. Different database systems may employ different techniques for processing queries that have different impacts on the speed at which the queries are processed.

SUMMARY

In some embodiments, a non-transitory machine-readable medium stores a program. The program receives, from a requestor, a query for data comprising a condition on a column of a table. The table includes a plurality of records divided into a plurality of zones. The program further determines a set of zones in the plurality of zones that include records that satisfy the condition based on metadata associated with each zone in the plurality of zones comprising a data interval of an expression on data values in the column of the table. The program also determines a result set of records in the table that satisfy the condition based on records in the set of zones. The program further sends the result set of records to the requestor.

In some embodiments, the condition may be a range condition on the expression. Determining the set of zones may include comparing the range condition on the expression to the data intervals of the expression associated with the plurality of zones, identifying, based on the comparisons, zones in the plurality of zones with a data interval of the expression that intersects with the range condition on the expression and including the identified zones in the set of zones. Determining the set of zones may include deducing a set of range conditions on the expression based on the condition, comparing each range condition on the expression in the set of range conditions on the expression to the data intervals of the expression associated with the plurality of zones, identifying, based on the comparisons, zones in the plurality of zones with a data interval of the expression that intersects with a range condition on the expression in the set of range conditions on the expression, and including the identified zones in the set of zones. Deducing the set of range conditions on the expression may be further based on a dictionary that includes a set of distinct values in the column of the table.

In some embodiments, determining the result set of records that satisfy the condition may include ignoring zones in the plurality of zones other than the set of zones in the plurality of zones. The column of the table may be a first column of the table. The condition may be on the first column of the table and a second column of the table. The data interval of the expression associated with each zone in the plurality of zones may be on data values in the first and second columns of the table.

In some embodiments, a method receives, from a requestor, a query for data comprising a condition on a column of a table. The table includes a plurality of records divided into a plurality of zones. The method further determines a set of zones in the plurality of zones that include records that satisfy the condition based on metadata associated with each zone in the plurality of zones comprising a data interval of an expression on data values in the column of the table. The method also determines a result set of records in the table that satisfy the condition based on records in the set of zones. The method further sends the result set of records to the requestor.

In some embodiments, the condition may be a range condition on the expression. Determining the set of zones may include comparing the range condition on the expression to the data intervals of the expression associated with the plurality of zones, identifying, based on the comparisons, zones in the plurality of zones with a data interval of the expression that intersects with the range condition on the expression, and including the identified zones in the set of zones. Determining the set of zones may include deducing a set of range conditions on the expression based on the condition, comparing each range condition on the expression in the set of range conditions on the expression to the data intervals of the expression associated with the plurality of zones, identifying, based on the comparisons, zones in the plurality of zones with a data interval of the expression that intersects with a range condition on the expression in the set of range conditions on the expression, and including the identified zones in the set of zones. Deducing the set of range conditions on the expression may be further based on a dictionary that includes a set of distinct values in the column of the table.

In some embodiments, determining the result set of records that satisfy the condition may include ignoring zones in the plurality of zones other than the set of zones in the plurality of zones. The column of the table may be a first column of the table. The condition may be on the first column of the table and a second column of the table. The data interval of the expression associated with each zone in the plurality of zones may be on data values in the first and second columns of the table.

In some embodiments, a system includes a set of processing units and a non-transitory computer-readable medium that stores instructions. The instructions cause at least one processing unit to receive, from a requestor, a query for data comprising a condition on a column of a table. The table includes a plurality of records divided into a plurality of zones. The instructions further cause the at least one processing unit to determine a set of zones in the plurality of zones that include records that satisfy the condition based on metadata associated with each zone in the plurality of zones comprising a data interval of an expression on data values in the column of the table. The instructions also cause the at least one processing unit to determine a result set of records in the table that satisfy the condition based on records in the set of zones. The instructions further cause the at least one processing unit to send the result set of records to the requestor.

In some embodiments, the condition may be a range condition on the expression. Determining the set of zones may include comparing the range condition on the expression to the data intervals of the expression associated with the plurality of zones, identifying, based on the comparisons, zones in the plurality of zones with a data interval of the expression that intersects with the range condition on the expression, and including the identified zones in the set of zones. Determining the set of zones may include deducing a set of range conditions on the expression based on the condition, comparing each range condition on the expression in the set of range conditions on the expression to the data intervals of the expression associated with the plurality of zones, identifying, based on the comparisons, zones in the plurality of zones with a data interval of the expression that intersects with a range condition on the expression in the set of range conditions on the expression, and including the identified zones in the set of zones. Deducing the set of range conditions on the expression may be further based on a dictionary that includes a set of distinct values in the column of the table.

In some embodiments, determining the result set of records that satisfy the condition may include ignoring zones in the plurality of zones other than the set of zones in the plurality of zones. The column of the table may be a first column of the table. The condition may be on the first column of the table and a second column of the table. The data interval of the expression associated with each zone in the plurality of zones may be on data values in the first and second columns of the table.

The following detailed description and accompanying drawings provide a better understanding of the nature and advantages of the present invention.

BRIEF DESCRIPTION OF THE DRAWINGS

FIG. 2 illustrates an example zone expression map according to some embodiments.

FIG. 3 illustrates another example zone expression map according to some embodiments.

FIG. 4 illustrates another example zone expression map according to some embodiments.

FIG. 5 illustrates another example zone expression map according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a system that processes queries for data based on zone expression maps. In some embodiments, the system defines a zone expression map for a mapped expression associated with one or more columns in a table of records. The table of records may be divided into a plurality of disjoint subsets of column record values (also referred to as zones) where each column record belongs to one and only one zone. The zone expression map may include, for each of the different zones, metadata associated with the mapped expression that describes the values in the column of the corresponding subset of records. When the system receives a query from an application or user that includes a condition, the system identifies a zone expression map associated with the condition. The system then uses the identified zone expression map to determine zones that include data that may satisfy the condition. Based on the zones, the system determines the records in the table to return to the application or the user.

In some embodiments, a zone expression map stores the minimum and maximum values seen for a specified expression over one or more columns in a table that is determined for each of a plurality of disjoint zones within that table can be used to accelerate queries. It can be used whenever a query contains a condition on those columns from which the system can deduce a set of range restrictions on that expression. Those range restrictions can then be compared to the minimum and maximum value for each zone looking to see whether there is any intersections between the deduced range restrictions and the range defined by the minimum and maximum for each zone. When there is no intersection for a zone then that entire zone has been disqualified and all rows that correspond to that zone can be ignored when determining the results of the query. When there is an intersection then the zone can be identified as qualified and the rows that correspond to that zone can be passed on to subsequent processing as required by the query, including the evaluation of the received condition. Thus, the zone expression map potentially allows queries to run faster because large portions of a table can be ignored during query processing based only on the examination of the conditions in the query and the small amount of data within a zone expression map.

Figure 1:
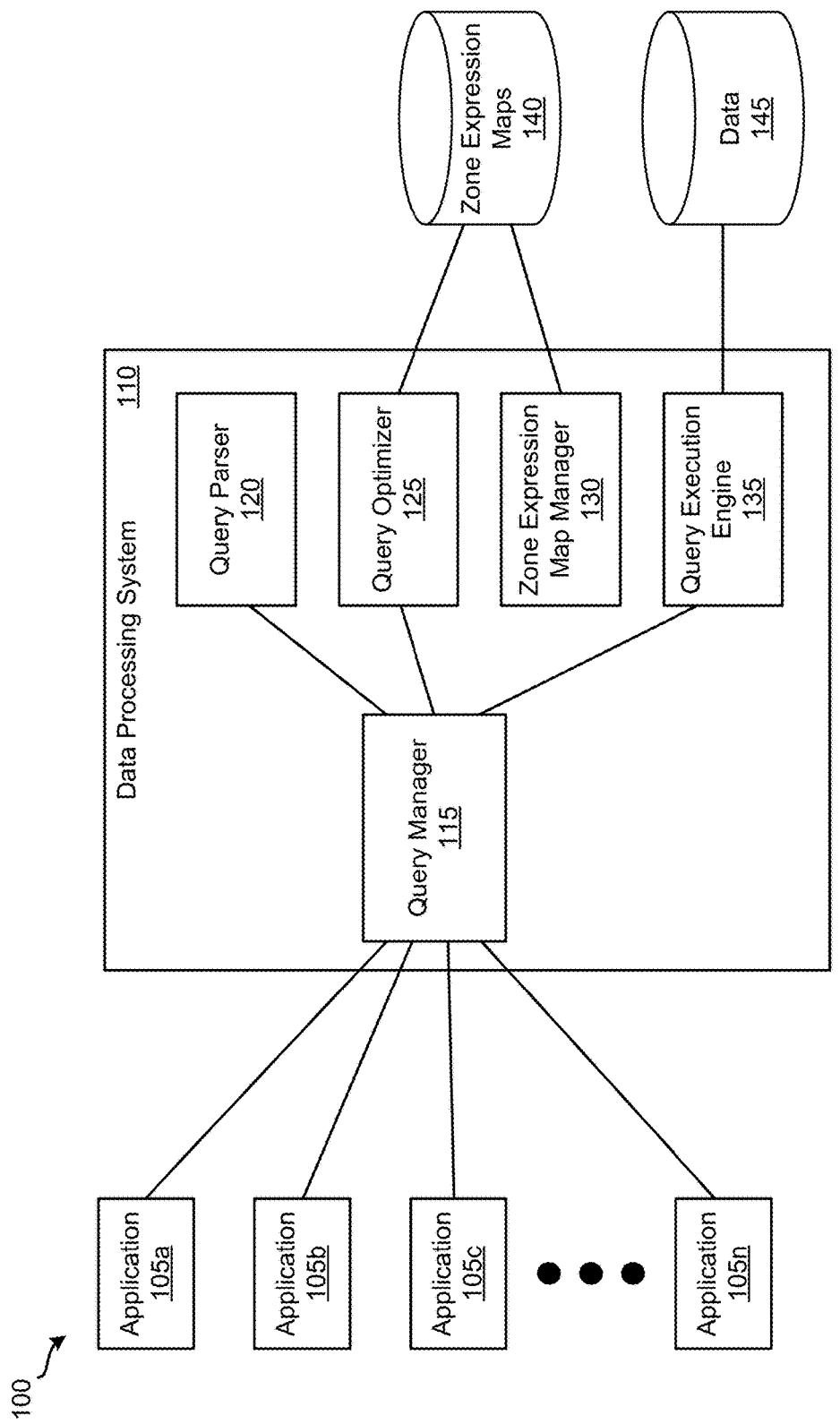
FIG. 1 illustrates a system according to some embodiments.

FIG. 1 illustrates a system 100 according to some embodiments. As shown, system includes applications 105a-n, data processing system 110, and storages 140 and 145. Applications 105a-n are software applications/programs that each includes instructions for performing a set of tasks when executed by a computing device (e.g., a desktop computer, a server computer, a laptop, a tablet, a mobile computing device, etc.). For instance, applications 105a-n may be configured to communicate with and request data stored in data storage 145 from data processing system 110 (e.g., by sending data processing system 110 queries for data). In addition, applications 105a-n can send data to data processing system 110 and request the data to be added to data storage 145. Also, applications 105a-n may send data processing system 110 requests to remove data from data storage 145. In some embodiments, one or more applications 105a-n may operate on a computing device separate from a computing device on which data processing system 110 operates. In other embodiments, one or more applications 105a-n may operate on the same computing device on which data processing system 110 operates.

Zone expression maps storage 140 is configured to store zone expression maps. Data storage 145 is configured to store various data that may be requested by applications 105a-n. Storages 140 and 145 may be relational databases, non-relational databases, or a combination thereof. In some embodiments, storages 140 and 145 are implemented in a single physical storage while, in other embodiments, storages 140 and 145 may be implemented across several physical storages. In other embodiments, storage 140 may be implemented in memory and not persistently stored in physical storage. While FIG. 1 shows storages 140 and 145 as external to system 110, one of ordinary skill in the art will appreciate that storages 140 and/or 145 may be part of system 110 in some embodiments.

Data processing system 110 is configured to process queries received from applications 105a-n for data in data storage 140. As illustrated in FIG. 1, data processing system 110 includes query manager 115, query parser 120, query optimizer 125, zone expression map manager 130, and query execution engine 135. Query manager 115 is responsible for managing the processing of queries received from applications 105a-n. For example, when query manager 115 receives a query from an application 105, query manager 115 forwards the query to query parser 120 for parsing. Once query manager 115 receives the parsed query from query parser, query manager 115 sends the parsed query to query optimizer 125 for processing. In return, query manager 115 receives a query plan from query optimizer 125. Query manager 115 then sends the query plan to query execution engine 135 for execution. Finally, query manager 115 receives a result set for the query from query execution engine 135 and forwards the result set for the query to the application 105.

Query parser 120 is configured to parse queries received from query manager 115. For example, when query parser 120 receives a query from query manager 115, query parser 120 may check the query string for syntactic correctness. Query parser 120 can also check the query string for semantic correctness. After parsing the query string, query parser 120 sends the parsed query to query manager 115.

Query optimizer 125 handles the planning and optimizing of the execution of queries. For instance, upon receiving a parsed query from query manager 115, query optimizer 125 generates a query plan for executing the query. In some embodiments, a query plan for a query is a set of operations that when executed retrieves data (e.g., a result set) for the query. Once query optimizer 125 has generated the query plan for the query, query optimizer 125 sends the completed query plan to query manager 115.

In some embodiments, query optimizer 125 may use zone expression maps for determining whether to include or exclude records for a query. Zone expression maps may be defined for arbitrary scalar value expressions (also referred to as mapped expressions) over one or more columns from a table of records, where the table is divided into a set of zones such that each column cell value belongs to exactly one zone. In some embodiments, a mapped expression can be any combination of one or more column values, constants, mathematical operators, string operators, and/or functions that can be interpreted and evaluated in order to generate a result value for that expression. A zone expression map may include, for each zone, metadata that describes the minimum value and the maximum value for the mapped expression when the mapped expression is evaluated over all the column values in the records in the zone.

Information associated with each zone may include the column cell values that belong to the zone and the set of rows that correspond to the zone. In some embodiments, such zone information is stored within each zone expression map. In other embodiments, such zone information is stored separately from the zone expression map (e.g., in data storage 145) with the advantage that the zone information can then be shared among multiple zone expression maps over different mapped expressions. For disk-based databases, each zone may be stored separately from zone expression maps and may correspond to all the table data stored within a set of disk pages. This way, reading data for a zone expression map stored in zone expression maps storage 140 avoids reading any columns for rows from disqualified zones stored in data storage 145. For a row-oriented database, each zone may correspond to the set of all rows stored in one set of disk pages. For a column-oriented database, each zone may correspond to the set of all column cell values for a specific column stored in one set of disk pages.

FIG. 2 illustrates an example zone expression map according to some embodiments. Specifically, FIG. 2 illustrates table 200, zone expression map 205 for a mapped expression, and cell values 210 from table 200. As shown, table 200 (Table T) includes 5 columns: column X, column BUY_DATE, column NAME, column AMT_BILLED, and column AMT_RECEIVED. In this example, column X of table 200 is divided into Zones 1-8. Each of the Zones 1-8 includes one or more values in column X of table 200 and each of the Zones 1-8 corresponds to a specific set of rows from table 200 (not shown).

For this example, zone expression map 200 is defined for an expression of a value modulus 5 stored in column X of table 200 (e.g., MODULUS(T.X, 5)). As illustrated, zone expression map 205 includes a mapping between Zones 1-8 of column X in table 200 and metadata associated with Zones 1-8. In particular, each of the Zones 1-8 (represented by a corresponding zone identifier (ID)) is associated with a minimum value and a maximum value of a range of values resulting from the evaluation of the mapped expression MODULUS(T.X, 5) on the values in column X of table 200 for the corresponding zone. In some embodiments, the range formed by the minimum value and maximum value metadata associated with each zone is referred to as a mapped expression range. In this example, the mapped expression range of values for Zone 1 is 1-3. The mapped expression range of values for Zones 2-4 and 8 is 0-4. The mapped expression range of values for Zone 5 is 0-3. The mapped expression range of values for Zone 6 is 4-4. The mapped expression range of values for Zone 7 is 2-4.

In this example, cell values 210 include the values in column X for each of the Zones 1-8. As shown, the values in column X for Zone 1, when evaluated by the expression of T.X modulus 5, determine the minimum value of 1 and maximum value of 3 of the range of values for Zone 1 in zone expression map 205. The values in column X for Zone 2, when evaluated by the expression of T.X modulus 5, determine the minimum value of 0 and maximum value of 4 of the range of values for Zone 2 in zone expression map 205. The values in column X for Zone 3, when evaluated by the expression of T.X modulus 5, determine the minimum value of 0 and maximum value of 4 of the range of values for Zone 3 in zone expression map 205. The values in column X for Zone 4, when evaluated by the expression of T.X modulus 5, determine the minimum value of 0 and maximum value of 4 of the range of values for Zone 4 in zone expression map 205. The values in column X for Zone 5, when evaluated by the expression of T.X modulus 5, determine the minimum value of 0 and maximum value of 3 of the range of values for Zone 5 in zone expression map 205. The values in column X for Zone 6, when evaluated by the expression of T.X modulus 5, determine the minimum value of 4 and maximum value of 4 of the range of values for Zone 6 in zone expression map 205. The values in column X for Zone 7, when evaluated by the expression of T.X modulus 5, determine the minimum value of 2 and maximum value of 4 of the range of values for Zone 7 in zone expression map 205. The values in column X for Zone 8, when evaluated by the expression of T.X modulus 5, determine the minimum value of 0 and maximum value of 4 of the range of values for Zone 8 in zone expression map 205.

Returning to FIG. 1, when query optimizer 125 receives a query that includes a condition on a column of a table for which a zone expression map is defined, query optimizer 125 determines whether the zone expression map can be used to accelerate the execution of the query. A simplest case where query optimizer 125 can determine that a zone expression map can be used is when the condition of the query is a range condition comparing the mapped expression specified for the zone expression map to one or more constant values. Examples of such range conditions include the following: MODULUS(T.X,5)<2, MODULUS (T.X,5)>=3, MODULUS(T.X,5) BETWEEN 1 and 2, and MODULUS(T.X,5) NOT BETWEEN 1 and 3, etc. Range conditions on a mapped expression directly describe the range(s) of values for the expression that satisfy the condition of the query. The NOT BETWEEN range condition above is an example where the condition requires multiple range restrictions (two range conditions in this case). In some embodiments, query optimizer 125 can identify a zone that may contain column values that can satisfy the condition of the query (also referred to as a qualified zone) by determining that the mapped expression range for the zone intersects with the range condition of the query. The optimizer 125 can then determine that such a qualified zone is to be included within a query plan for the query. Query optimizer 125 determines that a zone is to be excluded from a query plan (e.g., a disqualified zone) when none of the values in the mapped expression range intersects with range condition of the query. That is, none of the values for the column in a disqualified zone can satisfy the condition of the query. By including zones of values in, and excluding zones of values from a query plan for the query, the amount of values in the column that are read from disk for a disk-based database can be reduced, thereby improving the speed at which the query is executed. Similarly, for any kind of database, the number of values in the column over which the condition of the query is evaluated is reduced, thereby further improving the speed at which the query is executed. While the identification of qualified and disqualified zones is described as being implemented by query optimizer 125, one of ordinary skill in the art will appreciated that the identification of qualified and disqualified zones may be implemented by a different component (e.g., query execution engine 135) in some embodiments.

In some embodiments, query optimizer 125 may further classify qualified zones into different types of qualified zones. For example, query optimizer 125, in some such embodiments, may classify a qualified zone in which all values in the column of the table specified for the zone in the zone expression map satisfies the condition of the query as a guaranteed zone. In some embodiments, query optimizer 125 identifies a guaranteed zone by comparing the mapped expression range for a zone to the range condition(s) of a query and determining that the mapped expression range is a subset of one of the range condition(s). Query optimizer 125 may also classify a qualified zone in which some but not all of the values in the column of the table specified for the zone in the zone expression map satisfy the condition of the query as a border zone. Based on the classification of qualified zones, query optimizer 125 can reduce the costs of execution the query by creating a query plan that evaluates the condition of the query only on rows from border zones and then passes to the next query operation specified by the query all the rows from the guaranteed zones along with rows from the border zones that satisfied the condition of the query.

Referring to FIG. 2 as an example, query optimizer 125 may receive a query that includes a condition of a value in column X modulus 5 equal to 4 (e.g., MODULUS(T.X, 5)=4). In this example, query optimizer 125 determines that the condition of the query is a range condition on the mapped expression defined for zone expression map 205. In this example, the range condition on the mapped expression defined for zone expression map 205 is 4-4. Query optimizer 125 compares the range condition of the query to the mapped expression ranges for each of the Zones 1-8 in order to determine that the set of qualified zones includes Zones 2-4 and 6-8. Thus, query optimizer 125 includes these zones in a query plan for the query because those zones may contain values in column X that satisfy the condition of the query of MODULUS(T.X, 5)=4. Query optimizer 125 can further classify Zones 2-4, 7, and 8 as border zones since it can determine from zone expression map 205 that some but not all of the values for column X in these zones satisfy the condition of the query. Query optimizer 125 can also further classify Zone 6 as a guaranteed zone because it can determine from zone expression map 205 that all the values in column X for this zone satisfies the condition of the query. Further, for this example, query optimizer 125 determines that Zones 1 and 5 are disqualified zones as none of the values in column X for Zones 1 and 5 can satisfy the condition of the query of MODULUS(T.X, 5)=4. As such, query optimizer 125 excludes the disqualified Zones 1 and 5 from the query plan for the query.

In some embodiments, zone expression maps may be defined for different expressions on the same columns or different expressions on different columns of a table. Several examples of zone expression maps defined for different expressions on different columns of a table will now be described by reference to FIGS. 3 and 4. FIG. 3 illustrates another example zone expression map according to some embodiments. In particular, FIG. 3 illustrates table 200, zone expression map 305, and cell values 310 in tables 200. For this example, column BUY_DATE of table 200 is divided into Zones 1-8. Each of the Zones 1-8 includes values of one or more records of table 200 (not shown).

In this example, zone expression map 300 is defined for an expression that returns the month number of a date value stored in column BUY_DATE of table 200 (e.g., MONTH (T.BUY_DATE)). As illustrated, zone expression map 305 includes a mapping between Zones 1-8 of column BUY_DATE in table 200 and metadata associated with Zones 1-8. Specifically, each of the Zones 1-8 (represented by a corresponding zone identifier (ID)) is associated with a minimum value and a maximum value of a range of values resulting from the evaluation of the expression MONTH(T.BUY_DATE) on the date values in column BUY_DATE of table 200 for the corresponding zone. For this example, the mapped expression range of values for Zone 1 is 7-8. The range of values for Zone 2 is 8-9. The mapped expression range of values for Zone 3 is 9-9. The mapped expression range of values for Zone 4 is 9-10. The mapped expression range of values for Zone 5 is 1-12. The mapped expression range of values for Zone 6 is 0-2. The mapped expression range of values for Zone 7 is 2-5. The mapped expression range of values for Zone 8 is 5-6.

For this example, cell values 310 include the values in column BUY_DATE for each of the Zones 1-8. As illustrated, the date values in column BUY_DATE for Zone 1, when evaluated by the expression of MONTH(T.BUY_DATE), determine the minimum value of 7 and maximum value of 8 of the range of values for Zone 1 in zone expression map 305. The date values in column BUY_DATE for Zone 2, when evaluated by the expression of MONTH(T.BUY_DATE), determine the minimum value of 8 and maximum value of 9 of the range of values for Zone 2 in zone expression map 305. The date values in column BUY_DATE for Zone 3, when evaluated by the expression of Month (T.BUY_DATE), determine the minimum value of 9 and maximum value of 9 of the range of values for Zone 3 in zone expression map 305. The date values in column BUY_DATE for Zone 4, when evaluated by the expression of Month (T.BUY_DATE), determine the minimum value of 9 and maximum value of 10 of the range of values for Zone 4 in zone expression map 305. The date values in column BUY_DATE for Zone 5, when evaluated by the expression of Month (T.BUY_DATE), determine the minimum value of 1 and maximum value of 12 of the range of values for Zone 5 in zone expression map 305. The date values in column BUY_DATE for Zone 6, when evaluated by the expression of Month (T.BUY_DATE), determine the minimum value of 1 and maximum value of 2 of the range of values for Zone 2 in zone expression map 305. The date values in column BUY_DATE for Zone 7, when evaluated by the expression of Month (T.BUY_DATE), determine the minimum value of 2 and maximum value of 5 of the range of values for Zone 7 in zone expression map 305. The date values in column BUY_DATE for Zone 8, when evaluated by the expression of Month (T.BUY_DATE), determine the minimum value of 5 and maximum value of 6 of the range of values for Zone 8 in zone expression map 305.

FIG. 4 illustrates another example zone expression map according to some embodiments. Specifically, FIG. 4 illustrates table 200, zone expression map 405, and cell values 410 in tables 200. For this example, column NAME of table 200 is divided into Zones 1-8. Each of the Zones 1-8 includes values of one or more records of table 200 (not shown).

For this example, zone expression map 400 is defined for an expression of the length of a string value stored in column NAME of table 200 (e.g., LENGTH(T.NAME)). As shown, zone expression map 405 includes a mapping between Zones 1-8 of column NAME in table 200 and metadata associated with Zones 1-8. In particular, each of the Zones 1-8 (represented by a corresponding zone identifier (ID)) is associated with a minimum value and a maximum value of a range of values resulting from the evaluation of the expression LENGTH(T.NAME) on the string values in column NAME of table 200 for the corresponding zone. In this example, the mapped expression range of values for Zone 1 is 4-5. The mapped expression range of values for Zone 2 is 3-6. The mapped expression range of values for Zone 3 is 7-8. The mapped expression range of values for Zone 4 is 3-7. The mapped expression range of values for Zone 5 is 3-4. The mapped expression range of values for Zone 6 is 3-6. The mapped expression range of values for Zone 7 is 6-9. The mapped expression range of values for Zone 8 is 4-8.

In this example, cell values 410 include the values in column NAME for each of the Zones 1-8. As shown, the string values in column NAME for Zone 1, when evaluated by the expression of LENGTH(T.NAME), determine the minimum value of 4 and maximum value of 5 of the range of values for Zone 1 in zone expression map 405. The string values in column NAME for Zone 2, when evaluated by the expression of LENGTH(T.NAME), determine the minimum value of 3 and maximum value of 6 of the range of values for Zone 2 in zone expression map 405. The string values in column NAME for Zone 3, when evaluated by the expression of LENGTH(T.NAME), determine the minimum value of 7 and maximum value of 8 of the range of values for Zone 3 in zone expression map 405. The string values in column NAME for Zone 4, when evaluated by the expression of LENGTH(T.NAME), determine the minimum value of 3 and maximum value of 7 of the range of values for Zone 4 in zone expression map 405. The string values in column NAME for Zone 5, when evaluated by the expression of LENGTH(T.NAME), determine the minimum value of 3 and maximum value of 4 of the range of values for Zone 5 in zone expression map 405. The string values in column NAME for Zone 6, when evaluated by the expression of LENGTH(T.NAME), determine the minimum value of 3 and maximum value of 6 of the range of values for Zone 6 in zone expression map 405. The string values in column NAME for Zone 7, when evaluated by the expression of LENGTH(T.NAME), determine the minimum value of 6 and maximum value of 9 of the range of values for Zone 7 in zone expression map 405. The string values in column NAME for Zone 8, when evaluated by the expression of LENGTH(T.NAME), determine the minimum value of 4 and maximum value of 8 of the range of values for Zone 8 in zone expression map 405.

The examples and embodiments described above illustrate zone expression maps defined for an expression on a column of a table. In some embodiments, zone expression maps may be defined for an expression on several columns of a table. The following describes an example of such a zone expression map. FIG. 5 illustrates another example zone expression map according to some embodiments. In particular, FIG. 5 illustrates table 200, zone expression map 505, and cell value pairs 510 in tables 200. For this example, columns AMT_BILLED and AMT_RECEIVED of table 200 are divided into Zones 1-8 8 such that each column cell value belongs to only one zone and that the AMT_BILLED and AMT_RECEIVED cell values from any specific row in the table 200 belong to the same zone. Each of the Zones 1-8 includes values of one or more records of table 200 (not shown).

In this example, zone expression map 500 is defined for an expression of the difference between values on columns AMT_BILLED and AMT_RECEIVED of table 200 (e.g., T.AMT_BILLED−T.AMT_RECEIVED)). As illustrated, zone expression map 505 includes a mapping between Zones 1-8 of columns AMT_BILLED and AMT_RECEIVED in table 200 and metadata associated with Zones 1-8. Specifically, each of the Zones 1-8 (represented by a corresponding zone identifier (ID)) is associated with a minimum value and a maximum value of a range of values resulting from the evaluation of the expression T.AMT_BILLED−T.AMT_RECEIVED on the values in columns AMT_BILLED and AMT_RECEIVED of table 200 for each pair of values from the same row in the table within the corresponding zone. For this example, the range of values for Zones 1-4 is 0-0. The range of values for Zone 5 is (−3)-5. The range of values for Zone 6 is 13-23. The range of values for Zone 7 is 0-41. The range of values for Zone 8 is (−41)-36.

For this example, cell values 510 include the value pairs in columns AMT_BILLED and AMT_RECEIVED for each of the Zones 1-8. As illustrated, the values in columns AMT_BILLED and AMT_RECEIVED for Zones 1, when evaluated by the expression of T.AMT_BILLED−T.AMT_RECEIVED, determine the minimum value of 0 and maximum value of 0 of the range of values for Zone 1 in zone expression map 505. The values in columns AMT_BILLED and AMT_RECEIVED for Zone 2, when evaluated by the expression of T.AMT_BILLED−T.AMT_RECEIVED, determine the minimum value of 0 and maximum value of 0 of the range of values for Zone 2 in zone expression map 505. The values in columns AMT_

BILLED and AMT_RECEIVED for Zone 3, when evaluated by the expression of T.AMT_BILLED−T.AMT_RECEIVED, determine the minimum value of 0 and maximum value of 0 of the range of values for Zone 3 in zone expression map 505. The values in columns AMT_BILLED and AMT_RECEIVED for Zone 4, when evaluated by the expression of T.AMT_BILLED−T.AMT_RECEIVED, determine the minimum value of 0 and maximum value of 0 of the range of values for Zone 4 in zone expression map 505. The values in columns AMT_BILLED and AMT_RECEIVED for Zone 5, when evaluated by the expression of T.AMT_BILLED−T.AMT_RECEIVED, determine the minimum value of −3 and maximum value of 5 of the range of values for Zone 5 in zone expression map 505. The values in columns AMT_BILLED and AMT_RECEIVED for Zone 6, when evaluated by the expression of T.AMT_BILLED−T.AMT_RECEIVED, determine the minimum value of 13 and maximum value of 23 of the range of values for Zone 6 in zone expression map 505. The values in columns AMT_BILLED and AMT_RECEIVED for Zone 7, when evaluated by the expression of T.AMT_BILLED−T.AMT_RECEIVED, determine the minimum value of 0 and maximum value of 41 of the range of values for Zone 7 in zone expression map 505. The values in columns AMT_BILLED and AMT_RECEIVED for Zone 8, when evaluated by the expression of T.AMT_BILLED−T.AMT_RECEIVED, determine the minimum value of −41 and maximum value of 36 of the range of values for Zone 8 in zone expression map 505.

Returning to FIG. 1, query optimizer 125 may process queries that include conditions on one or more column(s) in a table for which any of the example zone expression maps described above by reference to FIGS. 3-5 are defined, in the same or similar manner as the example query described above by reference to FIG. 2. The zone expression maps described above by reference to FIGS. 2-5 illustrate several zone expression maps defined for several example expressions on columns of a table. One of ordinary skill in the art will appreciated that any number of additional and/or different zone expression maps may be defined for similar and/or different expressions on additional and/or different columns of a table.

In some instances, query optimizer 125 may receive a query from query manager 115 that includes a condition that is not a range condition on an expression for which a zone expression is defined. In some such instances, query optimizer 125 may use a zone expression map for generating a query plan for the query if the condition included in the query is a range condition on an expression that is semantically equivalent to another expression for which a zone expression map is defined. Referring to FIG. 3 as an example, a query that includes a range condition on an expression such as DATEPART (MONTH, T.BUY_DATE), which is equivalent to MONTH(T.BUY_DATE), may use zone expression map 305. Similarly, for mathematical expressions, query optimizer 125 may apply algebraic rules for expression equivalence to determine whether two expressions are equivalent. Referring to FIG. 5 as an example, a query that includes a range condition on the expression ((−1*T.AMT_RECEIVED)+T.AMT_BILLED) or the expression (10+(−1*T.AMT_RECEIVED)+T.AMT_BILLED−10) can use zone expression map 505.

In some other instances where query optimizer 125 receives a query from query manager 115 that includes a condition for which a zone expression is not defined or a condition that is not a range condition, query optimizer 125 may deduce from the condition of the query that the condition of the query can be satisfied when some expression for which a zone expression map is defined has a result value that falls within some restricted range of values. For example, a zone expression map defined for a string length function on a column of a table can be used to accelerate queries for equality conditions on that column because the string equality condition can be satisfied if the length of the constant in the condition is equal to the length of the mapped expression. Referring to FIG. 4 as an example, if a query includes a condition of T.NAME='Amy', query optimizer 125 may deduce that cell values that can satisfy the condition of the query also satisfy another condition of LENGTH (T.NAME)=3. In this example, the range restriction on the mapped expression of zone expression map 405 that query optimizer 125 deduces from the condition of the query is 3-3. Using the deduced range restriction and zone expression map 405, query optimizer 125 determines that Zones 1, 3, 7, and 8 are disqualified zones and, thus, excludes those zones from a query plan for the query. Similar to the above, a zone expression map defined for a string length function on a column of a table can also be used to accelerate queries when the condition of a query is a pattern match condition on that column. Referring to FIG. 4 as an example, if a query includes a pattern match condition of T.NAME LIKE 'Kimber*', query optimizer 125 may determine that, based on the pattern being match, the column cell values that can satisfy the condition of the query also satisfies the condition of LENGTH(T.NAME)>=6. For this example, the range restriction on the mapped expression of zone expression map 405 that query optimizer 125 deduces from the condition of the query is 6-infinity. Using the deduced range restriction and zone expression map 405, query optimizer 125 determines that Zones 1 and 5 are disqualified zones and, thus, excludes those zones from a query plan for the query.

As another example, a zone expression map defined for a date or time part function (e.g., a function that extracts the year from a date value, a function that extracts the month from a date value, a function that extracts the day from a date value, a function that extracts the hour from a date value, etc.) on a column may be used to restrict matches for equality or range conditions on the column. Referring to FIG. 3 as an example, if a query includes condition of T.BUY_DATE=2016/03/07, query optimizer 125 may deduce that this equality condition of the query can be satisfied by cell values that can also satisfy the condition of MONTH (T.BUY_DATE)=3. In this example, the range restriction on the mapped expression of zone expression map 305 that query optimizer 125 deduces from the condition of the query is 3-3. Then, using the deduced range restriction and zone expression map 305, query optimizer 125 determines that Zones 5 and 7 are qualified border zones and, thus, includes those zones in a query plan for the query and excludes all other zones. Referring to FIG. 3 for another example, if a query includes a condition of T.BUY_DATE BETWEEN 2015/01/01 AND 2015/02/15, query optimizer 125 may deduce that this BETWEEN condition of the query can be satisfied by cell values that can also satisfy the condition of MONTH(T.BUY_DATE) BETWEEN 1 AND 2. For this example, the range restriction on the mapped expression of zone expression map 305 that query optimizer 125 deduces from the condition of the query is 1-2. Using the deduced range restriction and zone expression map 305, query optimizer 125 determines that Zones 5, 6, and 7 are qualified border zones and, thus, includes those zones in a query plan for the query and excludes all other zones. Note that this technique of deducing a range restriction on a mapped expression of a zone expression map from a condition of a query is not limited to conditions of queries that are range conditions on column values. The technique can be applied to any type of single table conditions. The technique is also not limited to cases where the deduced restriction is a single range. The deduced restriction ranges may be numerous, but the same technique for determining that a zone is disqualified can still be applied by checking to see whether the mapped expression range for a zone has no intersection with the set of deduced restriction ranges.

Further, the technique of deducing a range restriction from a received condition described above is not limited to cases where there is some a priori known relationship between the condition of a query and the mapped expression of a zone expression map. For example, given any arbitrary received condition on a column where query optimizer 125 has available the set of all distinct values within that column, then query optimizer 125 can first evaluate the received condition for each of the distinct values in the column, and, for each value that satisfies the condition of the query, query optimizer 125 can then evaluate each mapped expression for zone expression maps defined on that column to determine whether any of those mapped expressions can be used to disqualify any zones. This form of deduction can be useful anytime there is a correlation between the condition of the query and the mapped expression of a zone expression map.

For example, given the mapped expression LENGTH (T.NAME) of zone expression map 405, a condition of a query in the form T.NAME LIKE 'A%a', which matches T.NAME values that start with 'A' and end with 'a', could use the technique above to deduce a restriction range of the form LENGTH(T.NAME)>=2. In this example, that restriction is not useful with zone expression map 405 because no zones can be disqualified. However, if system 100 includes a dictionary (e.g., stored in data storage 145) of all the distinct values for the T.NAME column, then the condition of the query can be evaluated against all the distinct values in the column. In this case, the condition of the query matches only the distinct values 'Ada' and 'Anna'. Evaluating the mapped expression LENGTH(T.NAME) on those two values produces the set of result values {3, 4}. Deducing a range restriction on the mapped expression from that set of expression result values produces the condition LENGTH (T.NAME) BETWEEN 3 and 4. Finally, using that deduced range restriction with the zone expression map 405 allows the optimizer to identify that the set of disqualified zones is {3, 7} and the set of qualified zones is {1, 2, 4, 5, 6, 8}.

As another example, if system 100 includes a dictionary (e.g., stored in data storage 145) of all the distinct values for the T.NAME values shown in 410, then a condition of a query in the form T.NAME LIKE '%n', which matches T.NAME values that end with 'n', can be evaluated against all the distinct values. In this case, that condition of the query matches only the values 'Ben', 'Allison', and 'Jonathan'. Evaluating the mapped expression LENGTH (T.NAME) from zone expression map 405 on each of those three values produces the set of mapped expression result values {3, 7, 8}. Building a set of range restriction on the mapped expression from that set of expression values produces two range restriction conditions, LENGTH (T.NAME)=3 and LENGTH(T.NAME) BETWEEN 7 and 8. Finally, using that pair of deduced range restrictions with the zone expression map 405 allows query optimizer 125 to identify that the set of disqualified zones is {1} (since the mapped expression range of this zone intersects neither of the deduced range restrictions) and the set of qualified zones is {2, 3, 4, 5, 6, 7, 8}.

Query execution engine 135 is responsible for execution query plans. For example, query execution engine 135 may receive a query plan for a query from query manager 115. In response, query execution engine 135 executes the query plan in order to generate a result set for the query. In some embodiments query execution engine 135 executes the query plan by accessing data storage 145, evaluating the condition included in the query on the values in zones included in the query plan, and retrieving data for the result set of the query based on the evaluations of the condition of the query. Once query execution engine 135 generates the result set for the query, query execution engine 135 sends the result set to query manager 115.

Zone expression map manager 130 is configured to manage zone expression maps. For example, when a zone expression map is defined for an expression on a column of a table, zone expression map manager 130 divides values in the column of the table into one or more zones and generates a mapping between sets of the values in the column of the table and the zones similar to the mappings of the zone expression maps illustrated in FIGS. 2-5. In some embodiments, the sets of values in the column of the table are disjoint subsets of values in the column of the table. That is, each value in the column of the table is included in only one zone. In some embodiments, such an approach may be used for column-oriented database tables.

Different columns of a table may be divided into different groups of zones. Referring to FIGS. 2-5 as an example, column X may be divided into Zones 1-8, as shown in FIG. 2, for zone expression map 205, column BUY_DATE may be divided into 5 zones for zone expression map 305, column NAME may be divided into 10 zones for expression map 405, and columns AMT_BILLED and AMT_RECEIVED may be divided into 6 zones for expression map 505. One of ordinary skill in the art will understand that a column of a table for which a zone expression map is defined may be divided into any number of different zones. In some embodiments, complete rows of a table (as opposed to values in a column of the table) can be divided into several zones. Such an approach may be used for row-oriented database tables in some such embodiments. In other embodiments, a combination of the two aforementioned approaches may be used on a table. Furthermore, the cell values of the table columns illustrated in FIGS. 2-5 (e.g., cell values 210, cell values 310, cell values 410, and cell values 510) are shown for purposes of simplicity and explanation. One of ordinary skill in the art will understand that the form in which the cell values are presented does not imply there is a separate data structure for storing the cell values nor does it imply any particular physical organization of the cell values.

In some instances, a zone express map is defined manually (e.g., via a tool provided by data processing system 110). In other instances, a zone expression map is defined automatically by data processing system 110 based on analysis of processed queries on columns of tables. Once the zones for the zone expression map are determined, for each zone, zone expression map manager 130 evaluates the expression specified by the zone expression map on the values in the column of the table in the zone, determines the minimum and maximum values from the evaluation of the expression, and includes the minimum and maximum values in the zone expression map as metadata associated with the zone. Finally, zone expression map manager 130 stores the zone expression map in zone expression maps storage 140 for later use.

Zone expression map manager 130 is also responsible for maintaining zone expression maps stored in zone expression maps storage 140. For instance, when new data is added to a table, zone expression map manager 130 updates zone expression maps that are defined for a column(s) in the table. Specifically, zone expression map manager 130 updates such zone expression maps by updating the minimum and maximum values (i.e., the mapped expression ranges) of the zones to which the new data is added. Similarly, when existing data in a table is updated, zone expression map manager 130 updates zone expression maps that are defined for a column(s) in the table. In particular, zone expression map manager 130 updates such zone expression maps by updating the minimum and maximum values (i.e., the mapped expression ranges) of the zones that include data that has been updated. This way, the metadata associated with the zones in zone expression maps are kept up-to-date and accurately reflect the data stored in the tables for which the zone expression maps are defined. When rows in a table are deleted or when handling values that have been replaced when existing data in a table is modified, zone expression map manager 130 may recalculate the minimum and maximum values for the mapped expression of zones that have rows that were deleted or modified, in some embodiments. This guarantees that the contents of the zone expression map are both accurate and precise. In other embodiments, zone expression map manager 130 may ignore the effect of row deletions or replaced cell values. Doing so guarantees that the cost of maintaining the zone expression map in the presence of any changes to contents of the table are at worst linear with the number of rows changed. However, doing so also implies that the mapped expression ranges may be wider than is strictly required by the current data in a zone, and therefore sometimes zones that could have been identified as disqualified will not be so identified.

Figure 6:
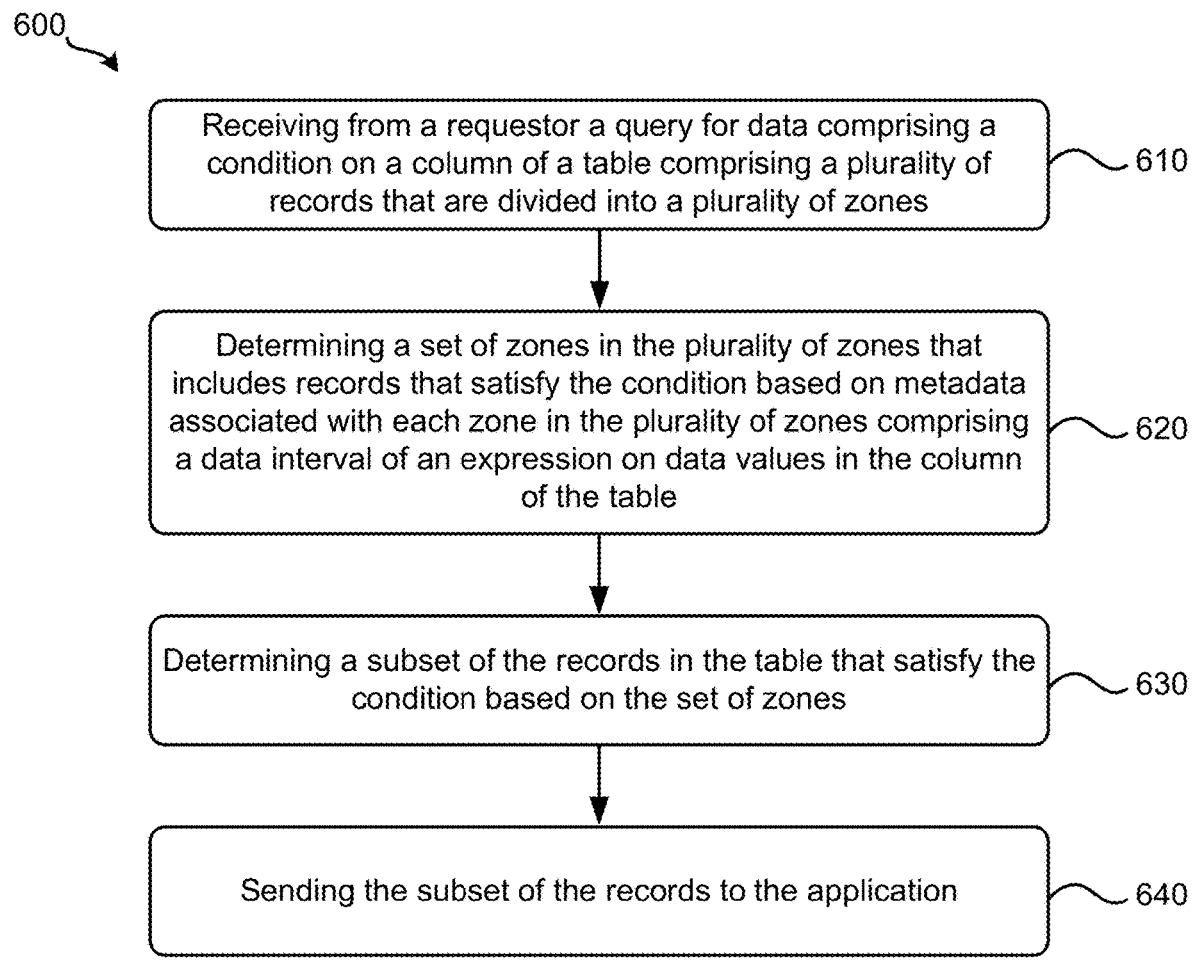
FIG. 6 illustrates a process for processing queries according to some embodiments.

FIG. 6 illustrates a process 600 for processing queries according to some embodiments. In some embodiments, data processing system 110 performs process 600. Process 600 starts by receiving, at 610, from a requestor (e.g., an application or a user) a query for data comprising a condition on a column of a table comprising a plurality of records. Referring to FIGS. 1 and 2 as an example, query manager 115 may receive from an application 105 a query for data comprising a condition of a value modulus 5=4 on column X of table 200 (e.g., MODULUS(T.X, 5)=4), which is divided into Zones 1-8.

Next, process 600 determines, at 620, a set of zones in a plurality of zones that include records that satisfy the condition based on metadata associated with each zone in the plurality of zones comprising a data interval of an expression on data values in the column of the table. In some embodiments, the condition of the query is a range condition on the expression. In some such embodiments, process 600 includes a zone in the set of zones when process 600 determines that the data interval of the expression associated with the zone intersects with the range condition of the query. Further, process 600 excludes a zone from the set of zones when none of the values in the data interval of the expression associated with the zone intersects with range condition of the query. Referring to FIGS. 1 and 2 to continue the example above, query optimizer 125 determines the set of zones to include Zones 2-4 and 6-8 because at least one value in column X for each of Zones 2-4 and 6-8 satisfies the condition of the query of MODULUS(T.X, 5)=4. Query optimizer 125 determines to exclude Zones 1 and 5 from the set of zones since none of the values in column X for each of Zones 1 and 5 can satisfy the condition of the query of Modulus (T.X, 5)=4. As such, query optimizer 125 includes Zones 2-4 and 6-8 in a query plan for the query.

Process 600 then determines, at 630, a result set of the records in the table that satisfy the condition based on the records in the set of zones. Referring to FIGS. 1 and 2 to continue the example above, query execution engine 125 determines the subset of the records in the table that satisfy the condition of the query based on the set of zones by executing the query plan for the query, which, as explained above, includes Zones 2-4 and 6-8 and excludes Zones 1 and 5. Query execution engine 125 may execute the query plan by accessing data storage 145, evaluating the condition included in the query on the values in zones included in the query plan, and performing any further processing on the data in order to determine the result set of the query. Finally, process 600 sends, at 640, the result set of records to the requestor.

Figure 7:
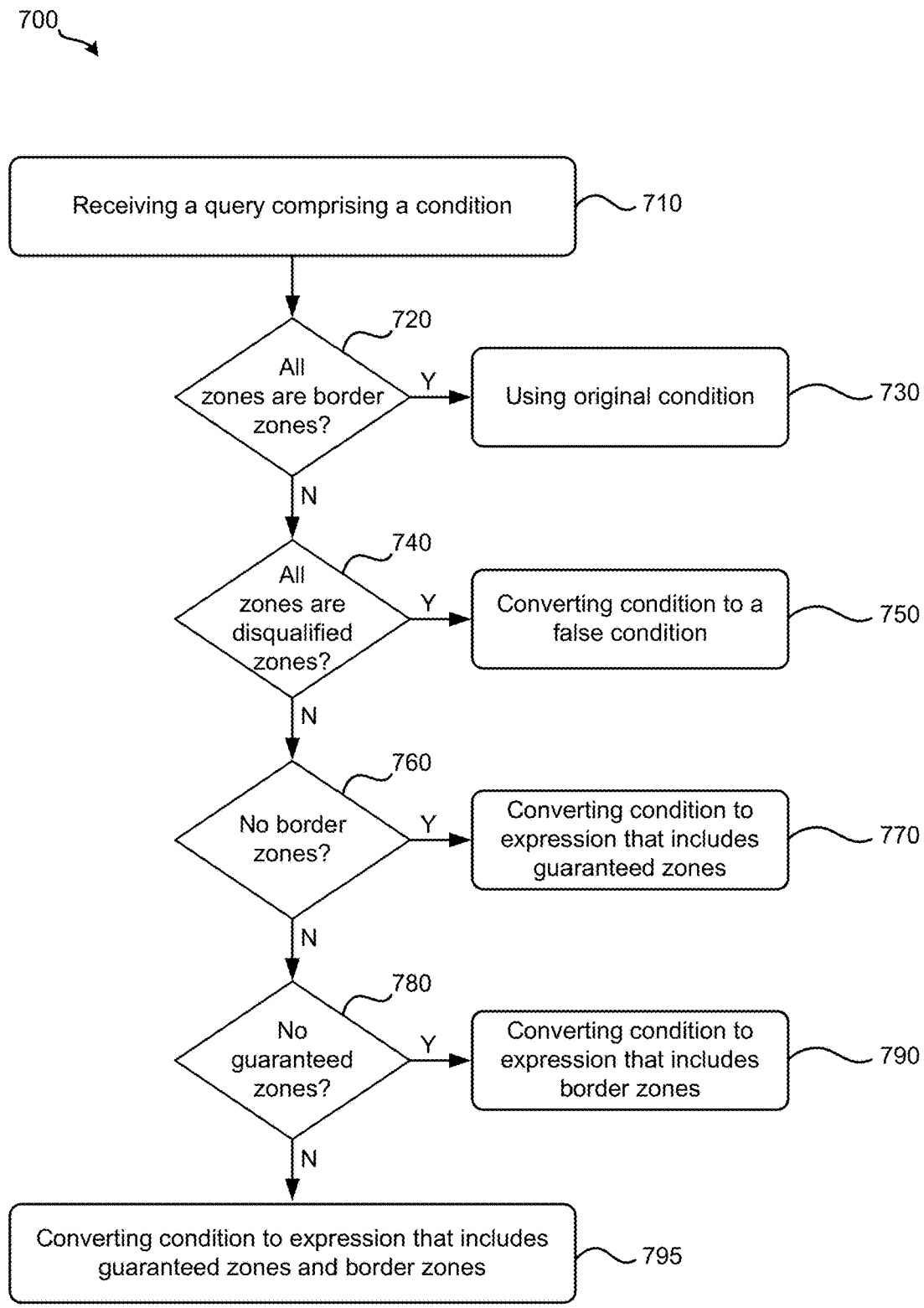
FIG. 7 illustrates a process for rewriting and simplifying conditions of queries according to some embodiments.

In some embodiments, the limiting of a query plan to a specific set of zones is encapsulated as a condition of a form like: ZONE_ID(T.X) IN (<list-of zone ids>), thereby enabling a condition of the query to be rewritten as a ZONE_ID prefilter condition based on the qualified zones AND'ed to the condition of the query. In some instances, each qualified zone may be further identified as either a guaranteed zone or a border zone. FIG. 7 illustrates a process 700 for rewriting and simplifying conditions of queries according to some embodiments. In particular, process 700 is performed in instances where zone limitations are expressed as a ZONE_ID condition and where guaranteed and border zones have been identified. In some embodiments, data processing system 110 performs process 700 as part of operation 610. Process 700 begins by receiving, at 710, a query comprising a condition. Referring to FIG. 1 as an example, query optimizer 125 may receive the (parsed) query comprising the condition from query manager 115. In this example, query optimizer 125 deduces that a zone expression map can be used for this condition and further identifies the qualified guaranteed zones, the qualified border zones, and the disqualified zones based on the zone expression map and the range restrictions on the mapped expression deduced from the condition of the query. In some embodiments, the condition of the query is replaced with the following compound condition: ZONE_ID (T.X) IN (<guaranteed-zones>) OR (ZONE_ID (T.X) IN (<border-zones>) AND <received-condition>)).

Next, process 700 determines, at 720 whether all the zones are border zones. If so, process 700 uses, at 730, the original condition of the query. Otherwise process determines, at 740, whether all the zones are disqualified zones. If so, process 700 converts, at 750, the condition of the query to a false condition (e.g., 0=1). Otherwise, process 700 determines, at 760, whether there are no border zones. If so, process 700 converts, at 770, the condition of the query to an expression that includes the guaranteed zones (e.g., ZONE_ID (T.X) IN (<guaranteed zones>). Otherwise, process determines, at 780, whether there are no guaranteed zones. If so, process 700 converts, at 790, the condition of the query to an expression that includes the border zones (e.g., ZONE_ID (T.X) IN (<border zones>) AND MOD (T.X, 5)=0). Otherwise, process converts, at 795, the condition of the query to the default compound expression that includes the guaranteed zones and the border zones and that evaluates the condition of the query for the rows in the border zones (e.g., ZONE_ID (T.X) IN (<guaranteed zones>) OR (ZONE_ID (T.X) IN (<border zones>) AND MOD (T.X, 5)=0)).

Figure 8:
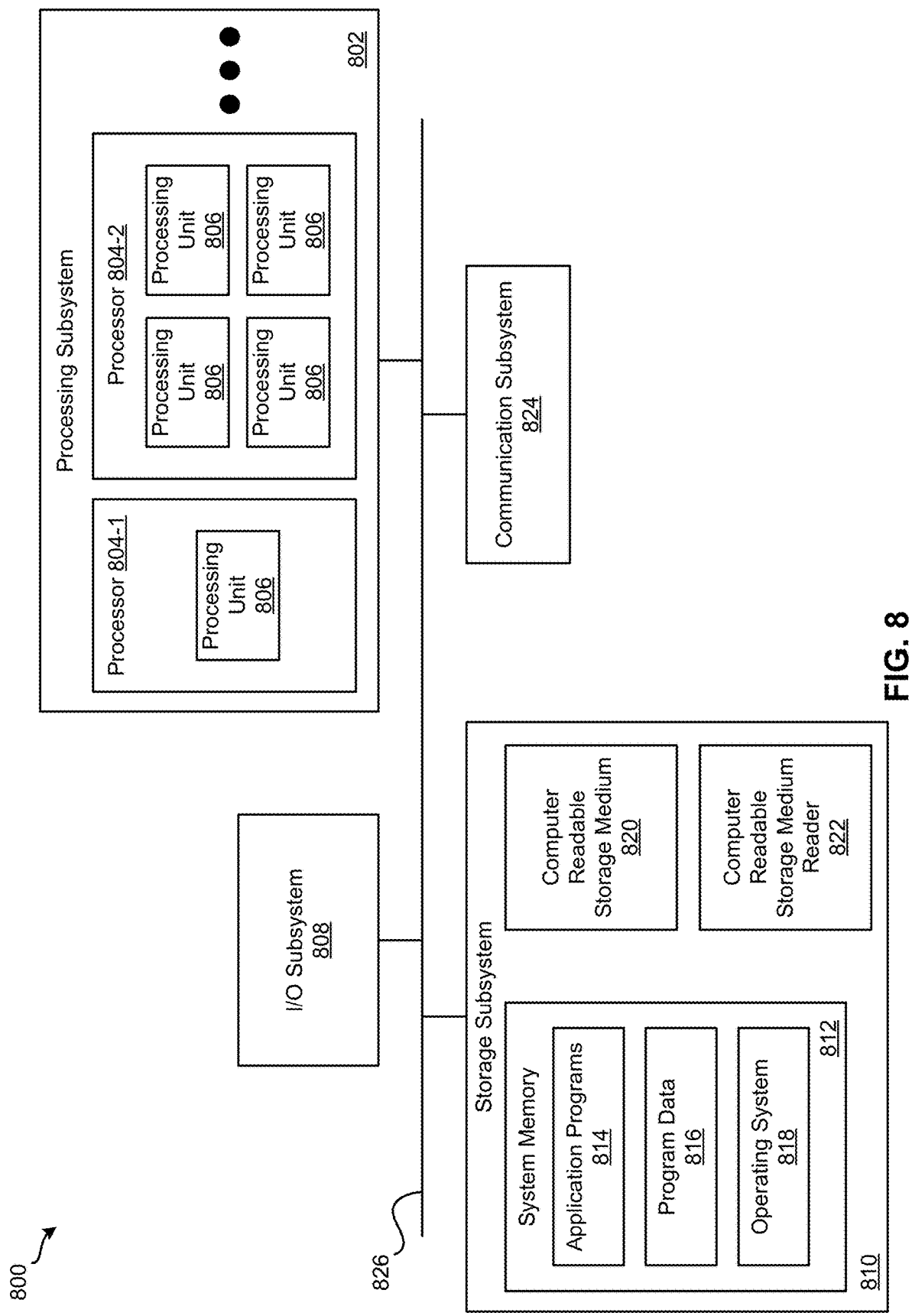
FIG. 8 illustrates an exemplary computer system, in which various embodiments may be implemented.

FIG. 8 illustrates an exemplary computer system 800 for implementing various embodiments described above. For example, computer system 800 may be used to implement data processing system 110. Computer system 800 may be a desktop computer, a laptop, a server computer, or any other type of computer system or combination thereof. Some or all elements of applications 105a-n, query manager 115, query parser 120, query optimizer 125, zone expression map manager 130, query execution engine 135, or combinations thereof can be included or implemented in computer system 800. In addition, computer system 800 can implement many of the operations, methods, and/or processes described above (e.g., processes 600 and 700). As shown in FIG. 8, computer system 800 includes processing subsystem 802, which communicates, via bus subsystem 826, with input/output (I/O) subsystem 808, storage subsystem 810 and communication subsystem 824.

Bus subsystem 826 is configured to facilitate communication among the various components and subsystems of computer system 800. While bus subsystem 826 is illustrated in FIG. 8 as a single bus, one of ordinary skill in the art will understand that bus subsystem 826 may be implemented as multiple buses. Bus subsystem 826 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 802, which can be implemented as one or more integrated circuits (e.g., a conventional microprocessor or microcontroller), controls the operation of computer system 800. Processing subsystem 802 may include one or more processors 804. Each processor 804 may include one processing unit 806 (e.g., a single core processor such as processor 804-1) or several processing units 806 (e.g., a multicore processor such as processor 804-2). In some embodiments, processors 804 of processing subsystem 802 may be implemented as independent processors while, in other embodiments, processors 804 of processing subsystem 802 may be implemented as multiple processors integrate into a single chip or multiple chips. Still, in some embodiments, processors 804 of processing subsystem 802 may be implemented as a combination of independent processors and multiple processors integrated into a single chip or multiple chips.

In some embodiments, processing subsystem 802 can execute a variety of programs or processes in response to program code and can maintain multiple concurrently executing programs or processes. At any given time, some or all of the program code to be executed can reside in processing subsystem 802 and/or in storage subsystem 810. Through suitable programming, processing subsystem 802 can provide various functionalities, such as the functionalities described above by reference to process 600, process 700, etc.

I/O subsystem 808 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 800 to a user or another device (e.g., a printer).

As illustrated in FIG. 8, storage subsystem 810 includes system memory 812, computer-readable storage medium 820, and computer-readable storage medium reader 822. System memory 812 may be configured to store software in the form of program instructions that are loadable and executable by processing subsystem 802 as well as data generated during the execution of program instructions. In some embodiments, system memory 812 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 812 may include different types of memory, such as static random access memory (SRAM) and/or dynamic random access memory (DRAM). System memory 812 may include a basic input/output system (BIOS), in some embodiments, that is configured to store basic routines to facilitate transferring information between elements within computer system 800 (e.g., during start-up). Such a BIOS may be stored in ROM (e.g., a ROM chip), flash memory, or any other type of memory that may be configured to store the BIOS.

As shown in FIG. 8, system memory 812 includes application programs 814 (e.g., application 105a-n), program data 816, and operating system (OS) 818. OS 818 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 820 may be a non-transitory computer-readable medium configured to store software (e.g., programs, code modules, data constructs, instructions, etc.). Many of the components (e.g., applications 105a-n, query manager 115, query parser 120, query optimizer 125, zone expression map manager 130, and query execution engine 135) and/or processes (e.g., processes 600 and 700) described above may be implemented as software that when executed by a processor or processing unit (e.g., a processor or processing unit of processing subsystem 802) performs the operations of such components and/or processes. Storage subsystem 810 may also store data used for, or generated during, the execution of the software.

Storage subsystem 810 may also include computer-readable storage medium reader 822 that is configured to communicate with computer-readable storage medium 820. Together and, optionally, in combination with system memory 812, computer-readable storage medium 820 may comprehensively represent remote, local, fixed, and/or removable storage devices plus storage media for temporarily and/or more permanently containing, storing, transmitting, and retrieving computer-readable information.

Computer-readable storage medium 820 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 824 serves as an interface for receiving data from, and transmitting data to, other devices, computer systems, and networks. For example, communication subsystem 824 may allow computer system 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 824 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 824 may provide components configured for wired communication (e.g., Ethernet) in addition to or instead of components configured for wireless communication.

One of ordinary skill in the art will realize that the architecture shown in FIG. 8 is only an example architecture of computer system 800, and that computer system 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
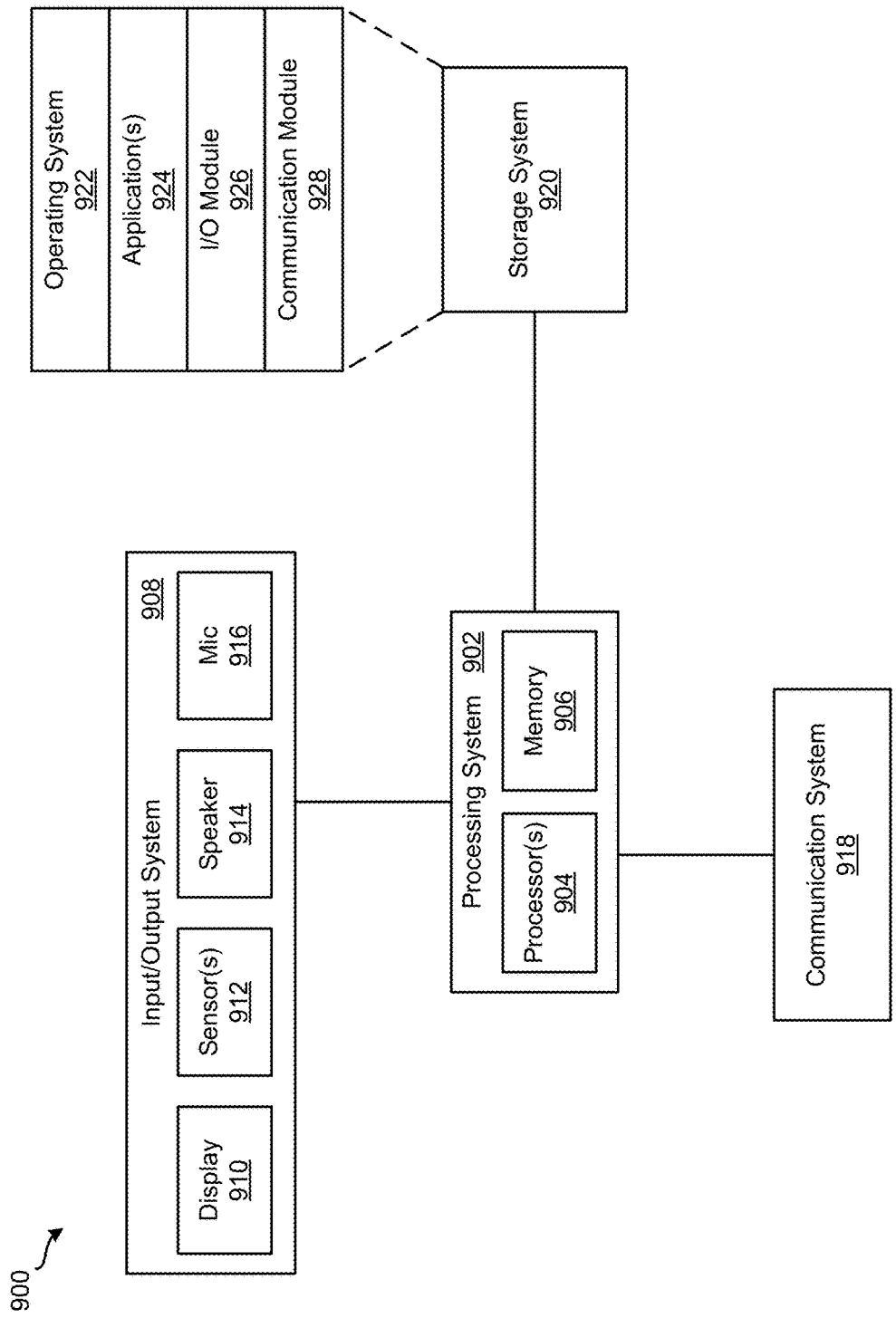
FIG. 9 illustrates an exemplary computing device, in which various embodiments may be implemented.

FIG. 9 illustrates an exemplary computing device 900 for implementing various embodiments described above. Computing device 900 may be a cellphone, a smartphone, a wearable device, an activity tracker or manager, a tablet, a personal digital assistant (PDA), a media player, or any other type of mobile computing device or combination thereof. Applications 105a-n can be included or implemented in computing device 900. As shown in FIG. 9, computing device 900 includes processing system 902, input/output (I/O) system 908, communication system 918, and storage system 920. These components may be coupled by one or more communication buses or signal lines.

Processing system 902, which can be implemented as one or more integrated circuits (e.g., a conventional microprocessor or microcontroller), controls the operation of computing device 900. As shown, processing system 902 includes one or more processors 904 and memory 906. Processors 904 are configured to run or execute various software and/or sets of instructions stored in memory 906 to perform various functions for computing device 900 and to process data.

Each processor of processors 904 may include one processing unit (e.g., a single core processor) or several processing units (e.g., a multicore processor). In some embodiments, processors 904 of processing system 902 may be implemented as independent processors while, in other embodiments, processors 904 of processing system 902 may be implemented as multiple processors integrate into a single chip. Still, in some embodiments, processors 904 of processing system 902 may be implemented as a combination of independent processors and multiple processors integrated into a single chip.

Memory 906 may be configured to receive and store software (e.g., operating system 922, applications 924, I/O module 926, communication module 928, etc. from storage system 920) in the form of program instructions that are loadable and executable by processors 904 as well as data generated during the execution of program instructions. In some embodiments, memory 906 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 908 is responsible for receiving input through various components and providing output through various components. As shown for this example, I/O system 908 includes display 910, one or more sensors 912, speaker 914, and microphone 916. Display 910 is configured to output visual information (e.g., a graphical user interface (GUI) generated and/or rendered by processors 904). In some embodiments, display 910 is a touch screen that is configured to also receive touch-based input. Display 910 may be implemented using liquid crystal display (LCD) technology, light-emitting diode (LED) technology, organic LED (OLED) technology, organic electro luminescence (OEL) technology, or any other type of display technologies. Sensors 912 may include any number of different types of sensors for measuring a physical quantity (e.g., temperature, force, pressure, acceleration, orientation, light, radiation, etc.). Speaker 914 is configured to output audio information and microphone 916 is configured to receive audio input. One of ordinary skill in the art will appreciate that I/O system 908 may include any number of additional, fewer, and/or different components. For instance, I/O system 908 may include a keypad or keyboard for receiving input, a port for transmitting data, receiving data and/or power, and/or communicating with another device or component, an image capture component for capturing photos and/or videos, etc.

Communication system 918 serves as an interface for receiving data from, and transmitting data to, other devices, computer systems, and networks. For example, communication system 918 may allow computing device 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 918 can include any number of different communication components. Examples of such components may include radio frequency (RF)

transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 918 may provide components configured for wired communication (e.g., Ethernet) in addition to or instead of components configured for wireless communication.

Storage system 920 handles the storage and management of data for computing device 900. Storage system 920 may be implemented by one or more non-transitory machine-readable mediums that are configured to store software (e.g., programs, code modules, data constructs, instructions, etc.) and store data used for, or generated during, the execution of the software. Many of the components (e.g., applications 105a-n) described above may be implemented as software that when executed by a processor or processing unit (e.g., processors 904 of processing system 902) performs the operations of such components and/or processes.

In this example, storage system 920 includes operating system 922, one or more applications 924, I/O module 926, and communication module 928. Operating system 922 includes various procedures, sets of instructions, software components and/or drivers for controlling and managing general system tasks (e.g., memory management, storage device control, power management, etc.) and facilitates communication between various hardware and software components. Operating system 922 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 924 can include any number of different applications installed on computing device 900. For example, an application 105 may be installed on computing device 900. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 926 manages information received via input components (e.g., display 910, sensors 912, and microphone 916) and information to be outputted via output components (e.g., display 910 and speaker 914). Communication module 928 facilitates communication with other devices via communication system 918 and includes various software components for handling data received from communication system 918.

One of ordinary skill in the art will realize that the architecture shown in FIG. 9 is only an example architecture of computing device 900, and that computing device 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
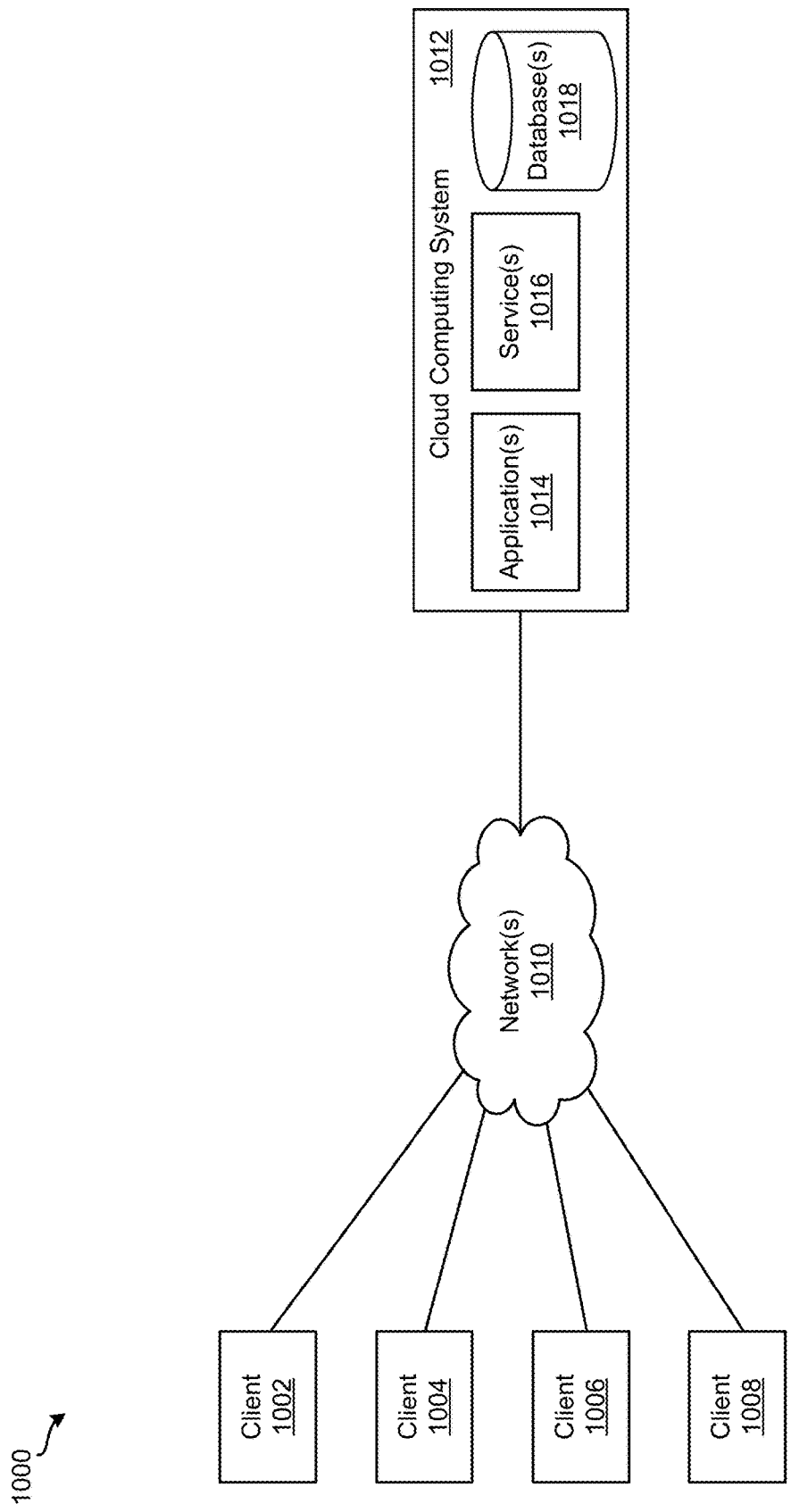
FIG. 10 illustrates system for implementing various embodiments described above.

FIG. 10 illustrates an exemplary system 1000 for implementing various embodiments described above. For example, cloud computing system 1012 of system 1000 may be used to implement data processing system 110. As shown, system 1000 includes client devices 1002-1008, one or more networks 1010, and cloud computing system 1012. Cloud computing system 1012 is configured to provide resources and data to client devices 1002-1008 via networks 1010. In some embodiments, cloud computing system 1000 provides resources to any number of different users (e.g., customers, tenants, organizations, etc.). Cloud computing system 1012 may be implemented by one or more computer systems (e.g., servers), virtual machines operating on a computer system, or a combination thereof.

As shown, cloud computing system 1012 includes one or more applications 1014, one or more services 1016, and one or more databases 1018. Cloud computing system 1000 may provide applications 1014, services 1016, and databases 1018 to any number of different customers in a self-service, subscription-based, elastically scalable, reliable, highly available, and secure manner.

In some embodiments, cloud computing system 1000 may be adapted to automatically provision, manage, and track a customer's subscriptions to services offered by cloud computing system 1000. Cloud computing system 1000 may provide cloud services via different deployment models. For example, cloud services may be provided under a public cloud model in which cloud computing system 1000 is owned by an organization selling cloud services and the cloud services are made available to the general public or different industry enterprises. As another example, cloud services may be provided under a private cloud model in which cloud computing system 1000 is operated solely for a single organization and may provide cloud services for one or more entities within the organization. The cloud services may also be provided under a community cloud model in which cloud computing system 1000 and the cloud services provided by cloud computing system 1000 are shared by several organizations in a related community. The cloud services may also be provided under a hybrid cloud model, which is a combination of two or more of the aforementioned different models.

In some instances, any one of applications 1014, services 1016, and databases 1018 made available to client devices 1002-1008 via networks 1010 from cloud computing system 1000 is referred to as a "cloud service." Typically, servers and systems that make up cloud computing system 1000 are different from the on-premises servers and systems of a customer. For example, cloud computing system 1000 may host an application and a user of one of client devices 1002-1008 may order and use the application via networks 1010.

Applications 1014 may include software applications that are configured to execute on cloud computing system 1012 (e.g., a computer system or a virtual machine operating on a computer system) and be accessed, controlled, managed, etc. via client devices 1002-1008. In some embodiments, applications 1014 may include server applications and/or mid-tier applications (e.g., HTTP (hypertext transport protocol) server applications, FTP (file transfer protocol) server applications, CGI (common gateway interface) server applications, JAVA server applications, etc.). Services 1016 are software components, modules, application, etc. that are configured to execute on cloud computing system 1012 and provide functionalities to client devices 1002-1008 via networks 1010. Services 1016 may be web-based services or on-demand cloud services.

Databases 1018 are configured to store and/or manage data that is accessed by applications 1014, services 1016, and/or client devices 1002-1008. For instance, storages 140 and 145 may be stored in databases 1018. Databases 1018 may reside on a non-transitory storage medium local to (and/or resident in) cloud computing system 1012, in a storage-area network (SAN), on a non-transitory storage medium local located remotely from cloud computing system 1012. In some embodiments, databases 1018 may include relational databases that are managed by a relational database management system (RDBMS). Databases 1018 may be a column-oriented databases, row-oriented databases, or a combination thereof. In some embodiments, some or all of databases 1018 are in-memory databases. That is, in some such embodiments, data for databases 1018 are stored and managed in memory (e.g., random access memory (RAM)).

Client devices 1002-1008 are configured to execute and operate a client application (e.g., a web browser, a proprietary client application, etc.) that communicates with applications 1014, services 1016, and/or databases 1018 via networks 1010. This way, client devices 1002-1008 may access the various functionalities provided by applications 1014, services 1016, and databases 1018 while applications 1014, services 1016, and databases 1018 are operating (e.g., hosted) on cloud computing system 1000. Client devices 1002-1008 may be computer system 800 or computing device 900, as described above by reference to FIGS. 8 and 9, respectively. Although system 1000 is shown with four client devices, any number of client devices may be supported.

Networks 1010 may be any type of network configured to facilitate data communications among client devices 1002-1008 and cloud computing system 1012 using any of a variety of network protocols. Networks 1010 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
    receiving, from a requestor, a query for data comprising a condition on a column of a table, the table comprising a plurality of records divided into a plurality of zones;
    determining a set of zones in the plurality of zones that include records that satisfy the condition based on metadata associated with each zone in the plurality of zones describing a range of values comprising results generated from evaluating an expression of a modulus function on data values in the column for records in the zone of the table, wherein the condition is a range condition on the expression, wherein determining the set of zones in the plurality of zones comprises:
        comparing the range condition on the expression to the range of values associated with each zone in the plurality of zones,
        identifying, based on the comparisons, zones in the plurality of zones with a range of values that intersects with the range condition on the expression, and including the identified zones in the set of zones;
    determining a result set of records in the table that satisfy the condition based on records in the set of zones; and
    sending the result set of records to the requestor.

2. The non-transitory machine-readable medium of claim 1, wherein determining the result set of records that satisfy the condition comprises ignoring zones in the plurality of zones other than the set of zones in the plurality of zones.

3. The non-transitory machine-readable medium of claim 1, wherein the column of the table is a first column of the table, wherein the condition is on the first column of the table and a second column of the table.

4. The non-transitory machine-readable medium of claim 3, wherein the results in the range of values associated with each zone in the plurality of zones is generated from evaluating the expression on data values in the first and second columns for records in the zone of the table.

5. The non-transitory machine-readable medium of claim 1, wherein the program further comprises a set of instructions for generating a query plan that includes the determined set of zones, wherein determining the result set of records comprises executing the query plan.

6. The non-transitory machine-readable medium of claim 1, wherein the program further comprises sets of instructions for:
    receiving a set of new data for addition to the table;
    adding the set of new data to the table; and
    updating a subset of the plurality of zones based on the added set of new data in the table.

7. The non-transitory machine-readable medium of claim 1, wherein the program further comprises sets of instructions for:
    removing a subset of the plurality of records from the table; and
    updating a subset of the plurality of zones based on the removed subset of the plurality of records.

8. A method comprising:
    receiving, from a requestor, a query for data comprising a condition on a column of a table, the table comprising a plurality of records divided into a plurality of zones;
    determining a set of zones in the plurality of zones that include records that satisfy the condition based on metadata associated with each zone in the plurality of zones describing a range of values comprising results generated from evaluating an expression of a modulus function on data values in the column for records in the zone of the table, wherein the condition is a range condition on the expression, wherein determining the set of zones in the plurality of zones comprises:
        comparing the range condition on the expression to the range of values associated with each zone in the plurality of zones,
        identifying, based on the comparisons, zones in the plurality of zones with a range of values that intersects with the range condition on the expression, and including the identified zones in the set of zones;
    determining a result set of records in the table that satisfy the condition based on records in the set of zones; and
    sending the result set of records to the requestor.

9. The method of claim 8, wherein determining the result set of records that satisfy the condition comprises ignoring zones in the plurality of zones other than the set of zones in the plurality of zones.

10. The method of claim 8, wherein the column of the table is a first column of the table, wherein the condition is on the first column of the table and a second column of the table.

11. The method of claim 10, wherein the results in the range of values associated with each zone in the plurality of zones is generated from evaluating the expression on data values in the first and second columns for records in the zone of the table.

12. The method of claim 8 further comprising generating a query plan that includes the determined set of zones, wherein determining the result set of records comprises executing the query plan.

13. The method of claim 8 further comprising:
receiving a set of new data for addition to the table;
adding the set of new data to the table; and
updating a subset of the plurality of zones based on the added set of new data in the table.

14. The method of claim 8 further comprising:
removing a subset of the plurality of records from the table; and
updating a subset of the plurality of zones based on the removed subset of the plurality of records.

15. A system comprising:
a set of processing units; and
a non-transitory computer-readable medium storing instructions that when executed by at least one processing unit in the set of processing units cause the at least one processing unit to:
receive, from a requestor, a query for data comprising a condition on a column of a table, the table comprising a plurality of records divided into a plurality of zones;
determine a set of zones in the plurality of zones that include records that satisfy the condition based on metadata associated with each zone in the plurality of zones describing a range of values comprising results generated from evaluating an expression of a modulus function on data values in the column for records in the zone of the table, wherein the condition is a range condition on the expression, wherein determining the set of zones in the plurality of zones comprises:
comparing the range condition on the expression to the range of values associated with each zone in the plurality of zones,
identifying, based on the comparisons, zones in the plurality of zones with a range of values that intersects with the range condition on the expression, and
including the identified zones in the set of zones;
determine a result set of records in the table that satisfy the condition based on records in the set of zones; and
send the result set of records to the requestor.

16. The system of claim 15, wherein determining the result set of records that satisfy the condition comprises ignoring zones in the plurality of zones other than the set of zones in the plurality of zones.

17. The system of claim 15, wherein the column of the table is a first column of the table, wherein the condition is on the first column of the table and a second column of the table, wherein the results in the range of values associated with each zone in the plurality of zones is generated from evaluating the expression on data values in the first and second columns for records in the zone of the table.

18. The system of claim 15, wherein the instructions further cause the at least one processing unit to generate a query plan that includes the determined set of zones, wherein determining the result set of records comprises executing the query plan.

19. The system of claim 15, wherein the instructions further cause the at least one processing unit to:
receive a set of new data for addition to the table;
add the set of new data to the table; and
update a subset of the plurality of zones based on the added set of new data in the table.

20. The system of claim 15, wherein the instructions further cause the at least one processing unit to:
remove a subset of the plurality of records from the table; and
update a subset of the plurality of zones based on the removed subset of the plurality of records.

* * * * *